Jan. 12, 1965     A. L. FACCOU     3,165,339
SWIVEL PIPE COUPLING
Filed May 25, 1961     2 Sheets-Sheet 1
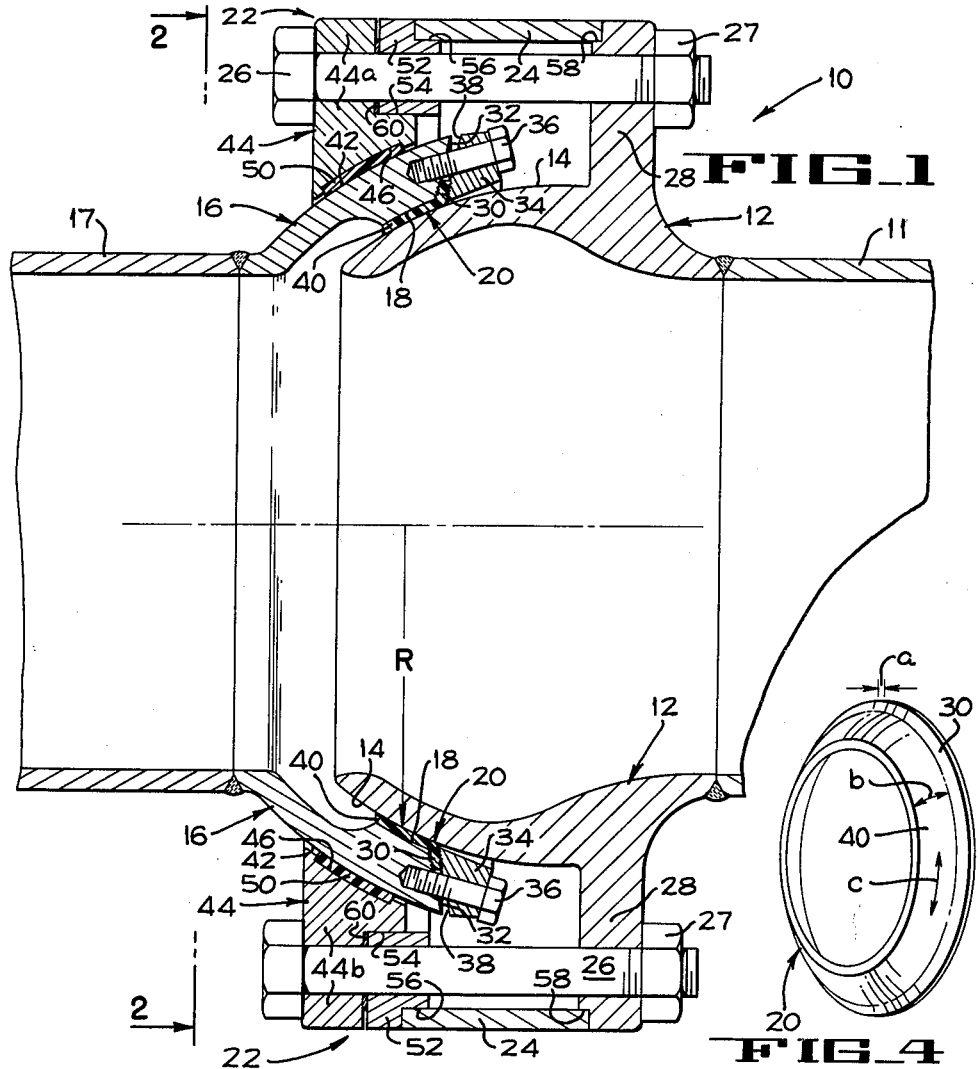
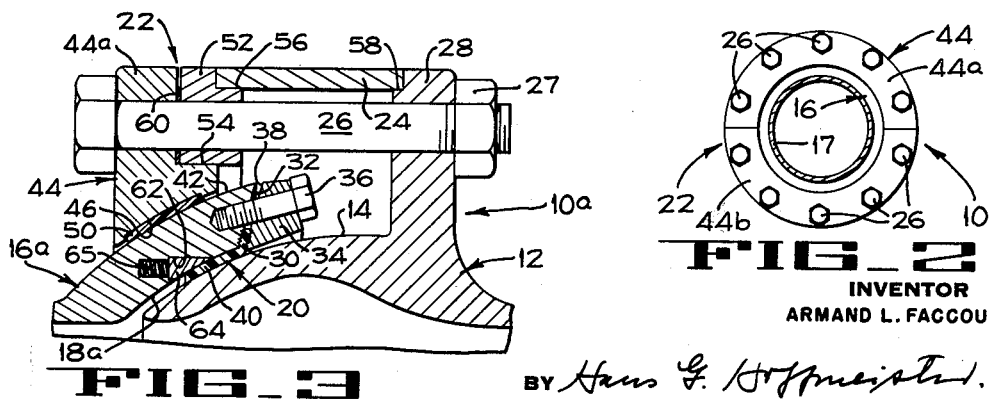
INVENTOR
ARMAND L. FACCOU
BY *Hans G. Hoffmeister*
ATTORNEY

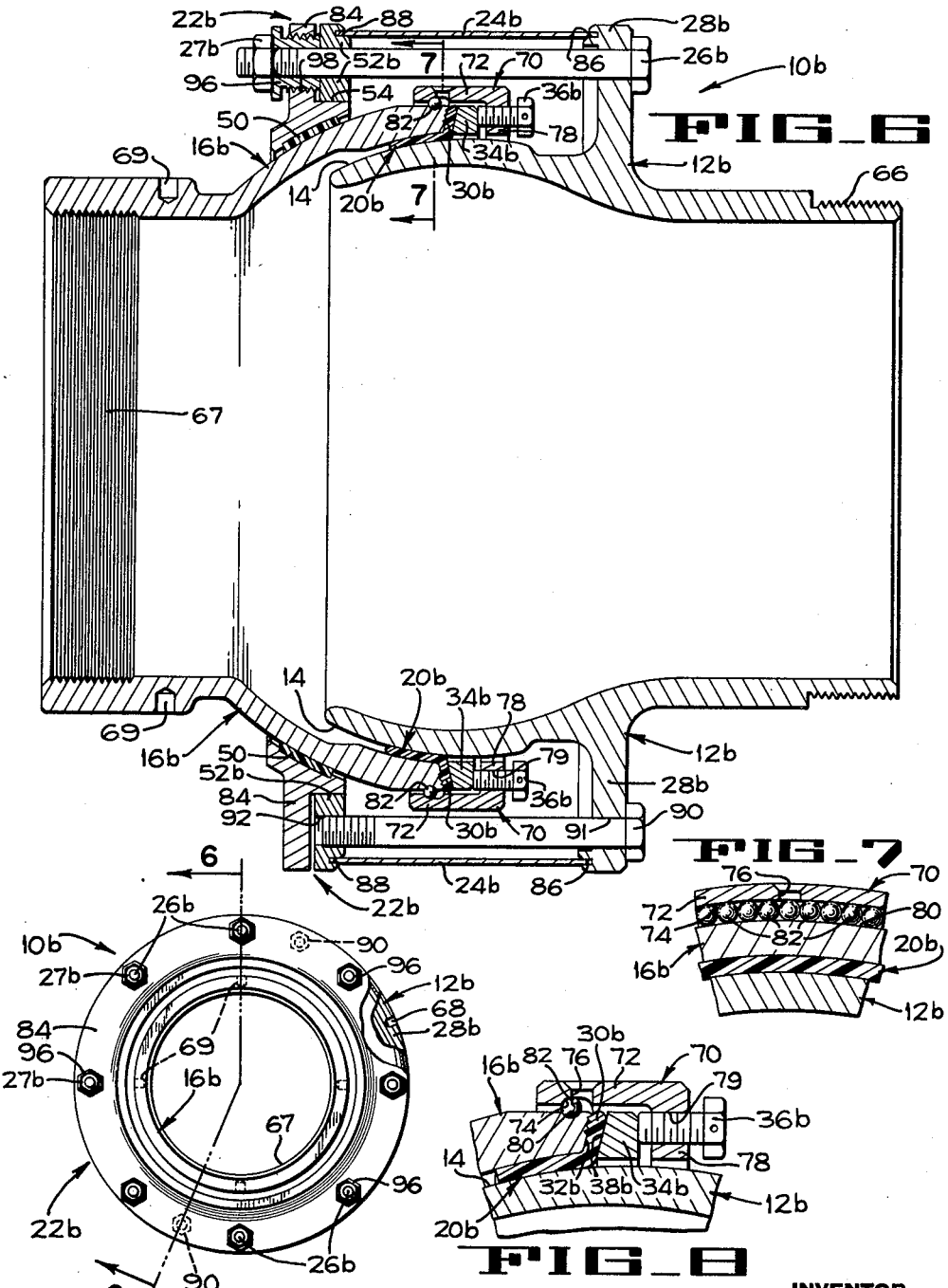

United States Patent Office 3,165,339
Patented Jan. 12, 1965

3,165,339
SWIVEL PIPE COUPLING
Armand L. Faccou, Santa Ana, Calif., assignor, by mesne assignments, to FMC Corporation, San Jose, Calif., a corporation of Delaware
Filed May 25, 1961, Ser. No. 112,683
4 Claims. (Cl. 285—263)

This invention relates generally to pipe or tube couplings, and more particularly relates to a ball and socket swivel type coupling for connecting pipes or tubes (to be referred to as pipes) in a manner permitting relative angular motion of the connected pipes.

The swivel coupling of this invention is of the ball and socket type wherein a ball member on one pipe swivels within a socket on the other pipe and means are provided for coupling the members together while accommodating swivel action. The coupling of the invention is particularly effective for the leak-free conduction of fluids at extremely low temperatures. For example, the coupling provides leak-free conduction of liquid oxygen and other liquefied gases at temperatures in the order of minus 300° F. (−185° C.). The coupling of the invention is also useful for conduction of low temperature refrigerants. One form of the invention is suited both for conducting gases at sub-atmospheric pressures, and for conducting fluids at elevated temperatures.

One object of the present invention is to provide a swivel pipe coupling that can be flexed while maintaining an effective fluid seal at extremely low temperatures. In the coupling of the present invention the fluid seal actually improves as the temperature of the fluid passing through the coupling decreases.

Another object of the present invention is to provide a swivel pipe coupling that provides an initial mechanical seal that is augmented by a progressively more effective fluid pressure seal, as the pressure of the fluid passing through the coupling increases.

Another object of the present invention is to provide a "multi-purpose" type swivel coupling that maintains an effective seal at both very low temperatures and at elevated temperatures, and will provide leak-free operation at both positive and negative internal pressures.

A further object of the present invention is to provide a swivel coupling which will retain its flexibility and maintain its sealing action while under either axial or radial loading, or both, and under a variety of temperature and pressure conditions.

Another object of the invention is to provide a swivel coupling that facilitates precise mechanical fitting during initial assembly, and which will retain such precise fitting upon subsequent disassembly and reassembly.

Another object of one form of the invention is to provide a full area clamping ring for clamping the flexible sealing ring of the swivel joint against the socket member, that does not require provision of tapped holes in the socket member.

A further object is to provide a readily adjustable stop or spacer assembly between the ball member and a bearing ring that engages the socket member, that can be finally adjusted without trial and error assembly and disassembly of the members.

Another object is to provide a spacer assembly between the ball member and a bearing ring that engages the socket member, which assembly is strong, light in weight and that can be individually mounted on the ball member of the swivel joint.

These and other objects of the present invention will become apparent by reference to the following detailed description taken in conjunction with the accompanying drawings wherein:

FIG. 1 is a longitudinal axial section of the coupling of the present invention.

FIG. 2 is a transverse section taken at 2—2 of FIG. 1 and drawn to a reduced scale.

FIG. 3 is a fragmentary section similar to FIG. 1, illustrating a modified embodiment of the coupling shown in FIG. 1, which will be referred to as a "multi-purpose" type coupling.

FIG. 4 is an isometric of the sealing ring indicating the linear contraction of the sealing ring in three planes.

FIG. 5 is an end elevation of another form of the coupling of the invention, with parts broken away.

FIG. 6 is a section taken on lines 6—6 of FIG. 5, and drawn to a larger scale.

FIG. 7 is a fragmentary enlarged section taken on lines 7—7 of FIG. 6.

FIG. 8 is a fragmentary section showing the sealing ring mounting of FIG. 6 on an enlarged scale.

As seen in FIG. 1, the coupling 10 is of the ball and socket type. The major elements of the coupling 10 include a hollow metal ball member 12 which in the form of the invention of FIG. 1 is welded to a conduit portion 11 which may be either a length of pipe, or a nipple formed for connection to a length of pipe in the usual manner. The ball member 12 is formed to provide an external spherical seat 14. Surrounding the ball member 12 is a metal socket member 16 connected to a pipe or nipple portion 17, and formed to provide a spherical internal seat 18 that faces seat 14 on ball member 12. A flexible sealing ring indicated generally at 20, is mounted on the socket member 16 and extends between seat 18 of the socket member and seat 14 of the ball member. The coupling parts just described are coupled together by a coupling ring assembly indicated generally at 22, a spacer sleeve 24, and bolts and nuts 26, 27 that connect the coupling ring assembly 22 to a radial flange 28 that is integral with ball member 12.

The major elements just referred to will now be described in detail.

The sealing ring 20 is molded of a flexible plastic material having a low coefficient of friction, the nature of the material of the sealing ring will be described in more detail presently. The sealing ring 20 includes a flared rim or mounting flange 30 that is clamped against the beveled end face 32 of the socket member 16 by a clamping ring 34 and bolts 36. Clamping ring 34 has a beveled or conical face 38 that is complementary to the beveled or conical end face 32 of the socket member 16, and the opposed beveled faces 32 and 38 are serrated to grip the mounting flange 30 of the sealing ring in fluid-tight assembly. The serrations also prevent cold flow of the elastomeric material of the sealing ring under clamping pressure. The sealing ring 20 includes also a sealing lip 40 that extends between and conforms to the ball member seat 14 and the socket member seat 18.

In order to provide for swiveled, detachable coupling of the ball and socket members together with the sealing ring, the socket member 16 is formed with an outer spherical seat 42. The coupling ring assembly 22, previously referred to, includes a split bearing ring indicated generally at 44, that is formed of identical semicircular halves 44a and 44b, as seen in FIG. 2. The radially inner face of the split bearing ring 44 is grooved at 46. The base of groove 46 is of spherical shape and an annular anti-friction bearing, or liner 50 is seated in the groove. Bearing 50 is formed of a plastic material having a low coefficient of friction, such as the type of material of which the sealing ring 20 is formed. The thickness of bearing 50 is such that it projects past the edges of the groove in the split bearing ring 44, and assumes the entire bearing load against seat 42 of the socket member.

The bearing ring 44 is split so that it can be assembled about the spherical seat 42 of the socket member 16 without access to the free end of the pipe 17 that is connected to the socket member. In those cases in which the bearing ring is split, the bearing 50 that fits thereon is also split. In order to retain the halves 44a and 44b of the split bearing ring 44 as an annulus, a retainer ring 52 is provided that has an inner diameter large enough for the retainer ring to slip over the end of the socket member 16 before the coupling parts are assembled. Retainer ring 52 makes a slip fit with an annular seat 54 formed on the split bearing ring 44, and so converts halves 44a and 44b of the split bearing ring 44 into a functionally unitary annulus.

In assembling the coupling, it is necessary that the coupling ring assembly 22, including the bearing 50, be brought into axial alignment with the ball member 12, in order to center the socket member 16 with the ball member. This function is performed by the spacer sleeve 24, previously mentioned. The spacer sleeve has a snug fit with an annular seat 56 formed on the retainer ring 52 and with an annular seat 58 formed on the ball member flange 28. The edges of the spacer ring 24 abut shoulders on the retainer ring 52 and on the flange 28 that bound the aforesaid annular seats 56 and 58, respectively, in order to axially locate the bearing ring 44 relatively to the ball member 12. This axial location determines the closeness of the fit between the major coupling elements, and because of manufacturing and molding tolerances provided, the parts are made for a selective fit at final assembly. This is accomplished by providing shims 60 between the bearing ring 44 and the retainer ring 52. The thickness of the shims or shim pack 60 is determined by assembly, testing, disassembly and shim adjustment. However, once the proper fit has been achieved, it will be retained upon subsequent disassembly and reassembly of the coupling because the fit of the retainer ring with the bearing ring is such that the retainer ring 52 remains in place on the bearing ring 44, thereby keeping the shims 60 in place.

The sealing ring 20 is formed of a pliable and resilient plastic material which has a high coefficient of thermal expansion relative to metals such as steel. The material will undergo considerable volumetric contraction at low temperatures, but it remains pliable at low temperatures, including temperatures in the order of $-300°$ F. ($-185°$ C.). In addition to these characteristics, the material is not seriously weakened at high temperatures of several hundred degrees Fahrenheit. The material also has a low coefficient of friction. A plastic material that meets these requirements is a trifluorchloroethylene polymer having the trade name "Kel-F." The material has a high tensile strength and the coefficient of thermal expansion of this material is in the range of $5-7 \times 10^{-5}/°$ C. Another suitable plastic material, that is somewhat more flexible at lower temperatures, is a tetrafluoroethylene polymer having the trade name "Teflon." The coefficient of thermal expansion of this material is in the range of $8-10 \times 10^{-5}/°$ C. Still another material that has properties that make it suitable for use as a sealing ring, is a chlorinated polyether polymer having the trade name "Penton." This plastic has a high tensile strength and a coefficient of thermal expansion of $8 \times 10^{-5}/°$ C. Thus these plastics have a contraction rate of from 5 to 10 times that of steel, which is the preferred material for the ball and socket members. The coefficient of thermal expansion for steel is $10.5 \times 10^{-6}/°$ C.

The sealing ring 20 is molded to approximately the shape shown in the drawings. However, the sealing lip 40 is molded to a slightly smaller diameter than the diameter of the complemnetary portion of the ball member seat 14, to provide an initial constrictive force and mechanical seal with the ball seat when assembly of the coupling is completed, and before fluid pressure is applied.

The manner in which the coupling of FIGS. 1 and 2 seals under positive internal pressure and at low temperatures will now be explained. As mentioned, the sealing ring is molded so that although the lip 40 has the same contour as that of the seat 14 of the ball member, the mean circumference of the lip is somewhat smaller than the mean circumference at the mid-radius R (FIG. 1) at which the sealing lip operates. Thus on assembly, lip 40 of the flexible sealing ring 20 is initially brought into mechanical sealing engagement with the seat 14 of ball member 12 because of the stretching of the lip 40 upon assembly. As pressure builds up within the coupling, fluid is prevented from leaking between the end face 32 of socket member 16 and the sealing ring by the clamped joint between flange 30 of the sealing ring and the end face 32 of socket member 16. As pressure builds up within the coupling, fluid is trapped between lip 40 of the sealing ring and socket member seat 18, which progressively augments the previously established mechanical seal between the flexible lip and the ball member seat 14. Thus, so long as a good initial contact is maintained between the flexible lip 40 and the ball member seat 14, the higher the pressure developed within the coupling, the more powerful is the hydraulic or fluid sealing force established between the aforesaid parts.

With the above considerations in mind, it can be seen that it is important to maintain an initial mechanical seal when the coupling is operated under conditions wherein fluid pressure builds up within the coupling while the parts are being subjected to progressively lower temperatures. The coupling of the present invention accomplishes this. Reference is made to FIG. 4. Contraction of the plastic sealing member at low temperatures is volumetric, and hence the linear components of such contraction fall in three planes. There is a reduction in the thickness of the sealing ring 20, indicated by the arrows at "a," but not only is this contraction negligible, it has no effect on the initial mechanical seal nor on the fluid-augmented sealing action between the lip 40 and the ball member seat 14, described above.

There is also a reduction in the radial dimension, or width of the annular sealing ring 20, indicated at arrow "b." This change in dimension likewise has no effect on the initial mechanical seal nor on the fluid-augmented sealing action. However, there is a third contraction which does have an important effect on the sealing action. This is the circumferential contraction of the lip 40 of the sealing ring, indicated at arrow "c" in FIG. 4. The circumferential contraction effect causes the lip 40 of the sealing ring to constrict about the ball member seat 14 and hence maintains the initial mechanical seal that is necessary for a fluid-augmented seal to progressively develop as fluid pressure increases in the highly cooled coupling. This circumferential contraction, or constriction may be termed the "hoop" effect of the sealing lip 40.

Some examples of the magnitude of this hoop effect with the sealing ring materials previously described will be given. Assume that liquid oxygen is to be conducted at $-185°$ C. ($-300°$ F.) in a coupling designed for a nominal 6" internal diameter pipe. The differential expansion effects between the plastic material of the sealing ring and the steel of the coupling ball member are such that the sealing ring will tend to shrink a certain amount circumferentially as the coupling is cooled. However, the steel ball member will prevent such shrinkage, so that the sealing ring will be correspondingly stretched upon cooling.

Table I gives the physical data of the coupling. In this regard, and in the examples to be given, it will be assumed that the coupling is designed to operate over a temperature range of from 71° C. (140° F.) to $-185°$ C. ($-300°$ F.). In molding the sealing ring, its mean circumference must be such that the hoop effect at 71° C. (140° F.) is adequate to establish an initial mechanical seal. As a typical example, it has been found that if the sealing lip is molded to a circumference such that it expands enough to just fit the ball member at 82° C. (160° F.), it will contract sufficiently at 71° C. (140° F.) to provide an adequate initial mechanical seal.

For design considerations, this gives a temperature range of 267° C. (460° F.) when handling liquid oxygen.

Table I

| | |
|---|---|
| Nominal pipe diameter | 6″. |
| Mean radius sealing ring | 4″. |
| Mean length sealing ring | 25″. |
| Thickness of sealing ring | 3/32″. |
| Width of sealing lip | 1″. |
| Cross sectional area sealing lip | 3/32 sq. in. |
| Temperature range (from +82° C. to −185° C.) | 267° C. (460° F.). |

Table II

| | Coefficient Expansion [1] (Contraction) | Shrinkage in Inches | Diff. Shrinkage, Inches | Modulus of Elasticity [2] (Tension), p.s.i. | Hoop Force, Pounds |
|---|---|---|---|---|---|
| A | $5 \times 10^{-5}/°$ C | 33.4/100 | 26.4/100 | $3 \times 10^5$ | 290 |
|   | $7 \times 10^{-5}/°$ C | 46.7/100 | 39.7/100 |  | 30 |
| B | $8 \times 10^{-5}/°$ C | 53.4/100 | 46.4/100 | $.5 \times 10^5$ | 87 |
|   | $10 \times 10^{-5}/°$ C | 66.7/100 | 59.7/100 |  | 12 |
| C | $8 \times 10^{-5}/°$ C | 53.4/100 | 46.4/100 | $1.6 \times 10^5$ | 278 |
| D | $10.5 \times 10^{-6}/°$ C | 7/100 | | | |

A—Kel-F; B—Teflon; C—Penton; D—Steel (material of the ball member).

[1] A dimensionless coefficient, given in terms of inches of contraction (or expansion) per inch of length of the sample.
[2] Given in terms of inches of deflection per inch of length of the sample.
The shrinkages given are circumferential.

Table II gives the constrictive force, or hoop effect in pounds for the three sealing ring materials mentioned over the temperature range referred to. Table II makes it clear that the initial mechanical sealing engagement between the sealing ring lip and the ball member will be maintained as the temperature drops. As fluid pressure in the coupling builds up, the fluid seal will not be lost, but will be augmented by the pressure of the fluid against lip 40, as previously described.

As to the hoop effect at the upper operating temperature of 71° C. (140° F.) previously given by way of example, since this represents a temperature range of 11° C. as compared to the total range of 267° C., the hoop effect at 71° C. (140° F.) will be about 1/25 that at −185° C. given in Table II. This is enough to provide the required initial mechanical seal.

FIG. 3 illustrates a modified coupling 10a which can be termed a "multi-purpose" coupling, because although it is primarily intended for use under conditions of sub-atmospheric internal pressures or at elevated temperatures, it is also as effective at low temperatures and at high internal pressures as is the coupling 10 of FIG. 1.

When the coupling 10 of FIG. 1 forms part of a vacuum line, as fluid pressure within the line is lowered during the period that the vacuum is being established, the atmosphere tends to flow into the coupling between the sealing lip 40 and ball member seat 14, and there is no counter fluid pressure sealing force developed between the sealing lip 40 and socket member seat 18 that exceeds the atmospheric pressure, as was the case when the interior of the coupling was subjected to a positive pressure.

Similarly, if the temperature of the coupling of FIG. 1 is increased by hot fluids passing through the coupling, the differential expansion rate between the plastic sealing member 20 and the metal ball member 12, instead of working to augment the initial mechanical seal as when the temperature was lowered, now works to reduce the effectiveness of such seal. The coupling of FIG. 3 compensates for both of these effects.

In the form of FIG. 3 socket member 16a is formed with an axially extending annular groove 62. Slidably mounted in the groove 62 is a pressure ring 64 which is resiliently pressed against the lip 40 of the sealing ring 20 by means of a series of springs 65. The springs are fitted in circumferentially spaced blind holes in the socket member 16a. As in the form of FIG. 1, the sealing ring 20 is molded to provide an initial mechanical seal with the ball member.

As mentioned, the coupling of FIG. 3 is a "multi-purpose" coupling in that it is not only effective against leakage as the coupling temperature is lowered, but it is effective when the temperature is elevated above the design point for the hoop effect, such as the 71° C. temperature previously mentioned. The coupling also seals when the coupling is in a vacuum line. As to vacuum operation, the maximum pressure differential to which the joint is apt to be subjected is 15 p.s.i. and the sealing action between lip 40 of the sealing ring and seat 14 of the ball member is effectively maintained by the spring loaded ring 64, at this relatively low external pressure.

The situation is somewhat different under elevated temperature operation, but even so the seal of the "multi-purpose" coupling of FIG. 3 is effective. As has been previously mentioned, the differential thermal expansion rate that exists between the plastic sealing ring 20 and the metal ball member 12, works to an advantage at low temperatures, by augmenting the mechanical seal or hoop effect, but reduces the hoop effect as the temperature is elevated. It has been described, by way of example, how a sealing ring can be molded to provide an adequate mechanical seal at 71° C. (140° F.). The pressure ring 64 maintains the required initial mechanical seal necessary to set up a fluid-augmented seal as pressure rises within the coupling, even though the temperature rises above the design point of 71° C. Thus the coupling of FIG. 3 will not leak so long as it is not continuously subjected to elevated temperatures that destroy or seriously soften the sealing ring 20. The sealing ring materials previously described have excellent temperature resistant properties. For example, the upper temperature limit for Kel-F is 390° F. (190° C.); that for Teflon is 550° F. (228° C.); and that for Penton is 290° F. (143° C.).

When operating at very low temperatures, where the plastic sealing ring stiffens, the effectiveness of the pressure ring 64 in establishing an initial mechanical seal is somewhat reduced. However, this is immaterial because, as indicated in Table II, the contraction effect comes into play, and this exerts a powerful, effective mechanical sealing action or hoop effect.

FIGS. 5–8 illustrate another form 10b of the swivel coupling of the invention, wherein a different sealing ring mounting is employed that provides a larger area clamping flange or rim of the sealing ring than in the forms previously described, and obviates the need for drilling and tapping the socket member for clamp bolts. In addition, shims are not required and the locating structure between the ball member and the bearing ring is lighter in weight.

Only the portions of the joint 10b that have a construction different from that previously explained with reference to FIGS. 1–3 will be described. It is to be understood that the pressure ring assembly of FIG. 3 can be incorporated in the socket member of the swivel coupling of FIGS. 5–8 in the same manner that it is incorporated in the swivel joint 10a of FIG. 3.

As seen in FIG. 6, the swivel coupling 10b is formed as a unit that can be threaded to the associated pipes. Thus the ball member 12b is formed with an externally threaded nipple portion 66, and the socket member 16b is formed with an internally threaded nipple portion 67. Four spanner wrench sockets 68 are formed in the flange 28b of ball member 12b, one socket appearing in the broken away portion of FIG. 5. Another set of four spanner wrench sockets 69 is formed in the nipple portion 67 of socket member 16b. These sockets facilitate screwing the coupling parts to their respective pipes.

As previously mentioned, the mounting for the sealing ring in the swivel coupling 10b is of a different construction from that previously described. The clamping ring 34b is pressed against the rim or flange 30b of the sealing ring 20b by a series of jack screws 36b mounted in a jack ring 70. Jack ring 70 is of L-shaped section and has an axially extending circumferential flange 72 that overlies the free end portion of socket member 16b when the parts are assembled. Axial flange 72 is formed with an internal ball race 74 (FIG. 8) and a radial access bore 76 is provided to admit retaining balls. Integral with axial flange 72 of the jack ring 70 is a radial flange 78 that has a series of tapped holes 79 that receive the jack screws 36b previously referred to. Adjacent the free end of socket member 16b is formed an external ball race 80, which cooperates with internal ball race 74 formed in the jack ring 70 to form an annular race or channel that receives a continuous annular series of retainer balls 82 (FIG. 7).

In making the assembly just described, the jack screws 36b are backed off and the rim or flange 30b of the molded sealing ring 20b is placed between the serrated end face 32b of the socket member 16b and the complementary face 38b of the clamping ring 34b. It will be noted that the rim or flange 30b of the sealing ring overlies the entire extent of the aforesaid complementary clamping faces in this form of the invention. With the jack screws 36b backed off, the balls 82 can be fed through the bore 76 in the jack ring until the annular channel formed by the internal and external ball races is filled with balls. The jack screws are then uniformly and progressively tightened to firmly clamp the rim or flange 39b of the sealing ring against the serrated end face 32b (FIG. 8) of the socket member 16b. During this clamping action the balls 82 serve as an annular lock ring that maintains the jack ring in axial position against the force of the jack screws. Once the jack screws have been tightened to remove clearances, the balls cannot fall out of the bore 76 in the jack ring. Since the serrated end face 32b of the socket member and the end face 38b of the clamping ring 34b are conical or beveled (FIG. 8), the clamping ring centers itself as the jack screws are tightened, so that adequate clearance is provided between the clamping ring and seat 14 of the ball member 12b.

After the jack screws are thus set up, and before the socket member 16b is coupled to the ball member 12b, the heads of the jack screws are wired (the wire is not shown) to maintain the parts in their clamped position. It will be noted that the socket member 16b requires no tapped holes for receiving clamping screws and so has no points of localized weakness. The ball race 80 formed in the socket member is shallow and does not appreciably affect the strength of the part.

The coupling ring assembly 22b for coupling the ball and socket members of swivel joint 10b is also of a modified construction. Since the members are threaded to their pipes, the bearing ring 84 (FIG. 6) need not be split, as are the bearing rings 44 of the previously described swivel couplings. The plastic bearing member 50 need not be split either. If desired, however, bearing ring 84 and the plastic bearing can be split, because the bearing ring mounts a retainer ring 52b with a close slip fit on a shoulder 54 (FIG. 6), as in the other forms.

In the swivel joint 10b, spacer ring 24b is provided as before, but in this case the spacer ring is bent up from sheet metal into a split annulus. One end of the spacer ring 24b is received in a groove 86 formed in flange 28b of the ball member, and the other end of the spacer ring is received in a groove 88 formed in the retainer ring 52b. The grooves confine the ends of the split sheet metal spacer ring 24b, so that the ring acts as a sturdy column without buckling, and the assembly is lighter in weight than that previously described.

Another feature of the coupling assembly being described is that the spacer ring 24b and the retainer ring 52b are assembled as a unit with the ball member 12b, before these parts are coupled to the bearing ring and hence to the socket member by bolts 26b. In order to accomplish this, two diametrically opposed bolts 90, one of which appears at the lower half of FIG. 6, extend through bores 91 formed in flange 28b of the ball member, and are threaded into tapped holes 92 formed in the retainer ring 52b. Thus the spacer ring 24b and the retainer ring 52b remain assembled with the ball joint upon disassembly of the coupling at bolts 26b.

In the swivel joints previously described a shim pack 60 was fitted between the bearing ring 44 and the retainer ring 52 to provide the proper fit between the assembled parts. This requires assembly, disassembly and reassembly of the parts for arriving at the desired friction fit between the socket member and the ball member and bearing ring. Although shims are economical and dependable in service, the coupling 10b provides a dependable adjustment that can be made without requiring assembly and disassembly of the parts.

Referring to the upper half of FIG. 6, a series of sleeve nuts 96 is provided, there being one nut for each bolt 26b. The sleeve nuts are threaded into tapped holes 98 formed in the bearing ring 84. The sleeve nuts have hexagonal heads (FIG. 5) for individual wrench adjustment in the bearing ring 84. The sleeve nuts form adjustable stops or spacers, and hence serve the function of shims 60 in the previously described swivel couplings. When the proper adjustment of the sleeve nuts is obtained, the nuts 27b are firmly tightened on bolts 26b. Nuts 27b are provided with internal nut locks or castellations (not shown) to maintain the assembly in coupled condition. Thus the final friction fit between the parts can be produced without assembly and disassembly of the coupling parts.

As previously mentioned, and as will be apparent from a comparison of FIGS. 3 and 6, the socket member 16b of FIG. 6 can be grooved to receive a spring loaded pressure ring such as ring 64 of FIG. 3, without change in the other parts of the coupling.

In the appended claims the term "pipe" is intended to refer to both the coupling of FIG. 1 wherein a pipe is welded to the ball or socket member or to both, and to the coupling of FIG. 6 wherein the pipes are in the form of nipples.

While several embodiments of the present invention have been shown and described, it will be understood that the coupling means described herein is capable of further modification and variation without departing from the principles of the invention, and the scope of the invention should be limited only by the scope and proper interpretation of the claims appended hereto.

This invention having been thus described, that which is claimed as new and desired to be protected by Letters Patent is:

1. A swivel pipe coupling comprising a pipe terminating in a socket member having spherical internal seat means and a spherical outer retaining face, another pipe terminating in a ball member having a spherical external seat within said socket member, a radial flange adjacent the junction of said pipe and said ball member, a pliable sealing ring connected to the free end of said socket member and having a sealing lip in sealing engagement with the external seat of said ball member, a coupling ring assembly surrounding said members, said coupling ring assembly comprising a relatively short bearing ring having bearing means formed with a spherical inner face that engages said outer retaining face on the socket member, said bearing ring being formed with an annular, axially inner seat that faces radially outward, said coupling ring assembly also comprising a retainer ring fitting on said bearing ring seat, said retainer ring having an annular axially inner spacer seat adjacent its periphery, the radial flange on said ball member having an annular, axially inner spacer seat aligned with said bearing ring spacer seat, an annular spacer extending between said retainer ring and the radial flange on said ball member and centered by said spacer seats, means for maintaining a pre-selected axial spacing between said bearing and retainer rings and means connecting said coupling ring assembly, including the spacer, with the radial flange on said ball member.

2. The coupling of claim 1, wherein said spacer seats are formed as grooves, said annular spacer being formed of relatively thin sheet metal with its ends seated in said grooves.

3. A swivel pipe coupling comprising a pipe terminating in a socket member having spherical internal seat means and a spherical outer retaining face, a pipe terminating in a ball member having a spherical external seat within said socket member, a radial flange adjacent the junction of said pipe and said ball member, a pliable sealing ring connected to the free end of said socket member and having a sealing lip in sealing engagement with the external seat of said ball member, a coupling ring assembly surrounding said members, said coupling ring assembly comprising a relatively short bearing ring having bearing means formed with a spherical inner face that engages said outer retaining face on the socket member, said bearing ring being formed with an annular, axially inner seat that faces radially outward, said coupling ring assembly also comprising a retainer ring fitting on said bearing ring seat, said retainer ring having an annular, axially inner spacer seat adjacent its periphery, the radial flange on said ball member having an annular, axially inner spacer seat aligned with said bearing ring spacer seat, an annular spacer extending between said retaining ring and the radial flange on said ball member and centered by said spacer seats, said bearing ring being formed with a radial flange that faces said retainer ring, sleeve nuts threaded into said bearing ring flange and engaging said retainer ring, bolts extending through the radial flange at said ball member and threaded into said retainer ring to independently retain said spacer ring and said retainer ring on said ball member, and bolts extending through the radial flange at said ball member, said retainer ring, and said sleeve nuts for connecting bearing ring to the remainder of said coupling ring assembly and to the radial flange at said ball member.

4. The coupling of claim 3, wherein said spacer seats are formed as grooves, said annular spacer being formed of relatively thin sheet metal with its ends seated in said grooves.

References Cited in the file of this patent
UNITED STATES PATENTS

| | | |
|---|---|---|
| 743,511 | Huxley | Nov. 10, 1903 |
| 1,532,195 | Morrison | Apr. 7, 1925 |
| 1,925,406 | Shaffer | Sept. 5, 1933 |
| 1,947,657 | Peress | Feb. 20, 1934 |
| 1,949,055 | Lambie | Feb. 27, 1934 |
| 1,964,044 | Engel | June 26, 1934 |
| 3,033,595 | Bard | May 8, 1962 |
| 3,056,615 | Breitenstein | Oct. 2, 1962 |

FOREIGN PATENTS

| | | |
|---|---|---|
| 651,430 | France | Oct. 9, 1928 |
| 489,884 | Germany | Jan. 2, 1930 |

OTHER REFERENCES

Golding: Polymers and Resins, copyright 1959 by D. Van Nostrand, Princeton, New Jersey, pages 18–23 relied on.